July 16, 1957

P. KOLLSMAN 2,799,644

APPARATUS FOR TRANSFERRING ELECTROLYTES
FROM ONE SOLUTION INTO ANOTHER

Filed Nov. 18, 1955

PAUL KOLLSMAN,
INVENTOR.

BY Howard G. Russell
his ATTORNEY

July 16, 1957 P. KOLLSMAN 2,799,644
APPARATUS FOR TRANSFERRING ELECTROLYTES
FROM ONE SOLUTION INTO ANOTHER
Filed Nov. 18, 1955 3 Sheets-Sheet 3

INVENTOR.
PAUL KOLLSMAN
BY
Howard B. Russell
his ATTORNEY

United States Patent Office 2,799,644
Patented July 16, 1957

2,799,644
APPARATUS FOR TRANSFERRING ELECTROLYTES FROM ONE SOLUTION INTO ANOTHER

Paul Kollsman, New York, N. Y.

Application November 18, 1955, Serial No. 547,737

13 Claims. (Cl. 204—301)

This invention relates to improvements in apparatus for producing chemical changes in liquids by electrodialysis involving the transfer of ions through fluid-confining walls of a substance having ion discriminating character.

This application is a continuation-in-part of my earlier application Serial No. 122,057, filed October 18, 1949, now abandoned.

This invention has particular application to the treatment of naturally occurring saline water, such as sea water or brackish water, for the purpose of converting the saline water into fresh water either with or without simultaneous production of water of increased salt content, conveniently called brine, as a useable by-product. However, the invention is not limited to the treatment of saline waters, but offers many advantages in the treatment of other liquids by electrodialysis, particularly in the deionization of such liquids.

The fundamentals of ion transfer have been known for many years. Briefly, the principle underlying electrodialysis is the fact that compounds in solution, for example, salt in water, split into ions carrying electric charges. These ions can be forced to move in a controlled fashion under the influence of an impressed electrical potential which may be created between a positively charged anode and a negatively charged cathode. The negative ions tend to travel to the anode, and are called anions for this reason, and the positively charged ions are attracted by the cathode and are called cations.

Means are also known for selectively restricting or impeding the movement of ions which are under the influence of biasing electrodes. Substances are known which, if formed into fluid tight films or membranes, permit anions to pass therethrough while obstructing the passage of cations and other substances are known which permit cations to pass therethrough while blocking the passage of anions.

This invention provides an apparatus for carrying out electrodialysis on an economic and commercial scale. More particularly, the invention provides a compact apparatus for feeding saline water for the purpose of producing purified water, herein sometimes referred to as "fresh water" in which the salt content is reduced sufficiently to make the water fit for agricultural and industrial uses, and even for human consumption as drinking water. Simultaneously, the apparatus may be used to produce water of an increased salt content, hereinafter referred to as brine, as a useable by-product.

More particularly, the invention provides improvements which lead to a greater degree of deionization by a reduction of the effects of leakage on the deionized liquid.

It has long been known that ion discriminating membranes, generally referred to as permselective membranes, are not one hundred percent effective in preventing the passage of ions therethrough which the membranes are designed to obstruct. For example, membranes which are anion permeable and cation passage resistant permit a certain number of cations to leak therethrough. Such leakage ions pass into the dilute and contaminate it with the result that the deionization of an ionic solution cannot be carried out beyond a certain degree depending on a plurality of factors. Factors which influence the degree of leakage are the permselective quality of the membrane, this being an inherent limitation of the membrane, and the difference in ionic concentration on opposite sides of the membrane, this being an operational limitation. The permselective qualities of the membrane depend, to some extent, on the pore size and on other factors.

The invention provides structural improvements by means of which the passage of leakage ions into the dilute is reduced to a fraction of the normal leakage obtaining under comparable circumstances. This is accomplished by providing paths through which the leakage ions can by-pass the liquid space containing the dilute, or at least by-pass the portions of the diluting chambers through which rapid flow occurs.

The aforementioned structural improvements also lead to greater efficiency of the apparatus by reason of reduced ohmic resistance as will become apparent from the following description.

These and various other objects, features and advantages of the invention will appear more fully from the detailed description which follows, accompanied by drawings, showing for the purpose of illustration preferred embodiments of the invention. The invention also resides in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out, may be better understood by referring to the following description taken in connection with the accompanying drawings forming a part of it, in which:

Figure 1:
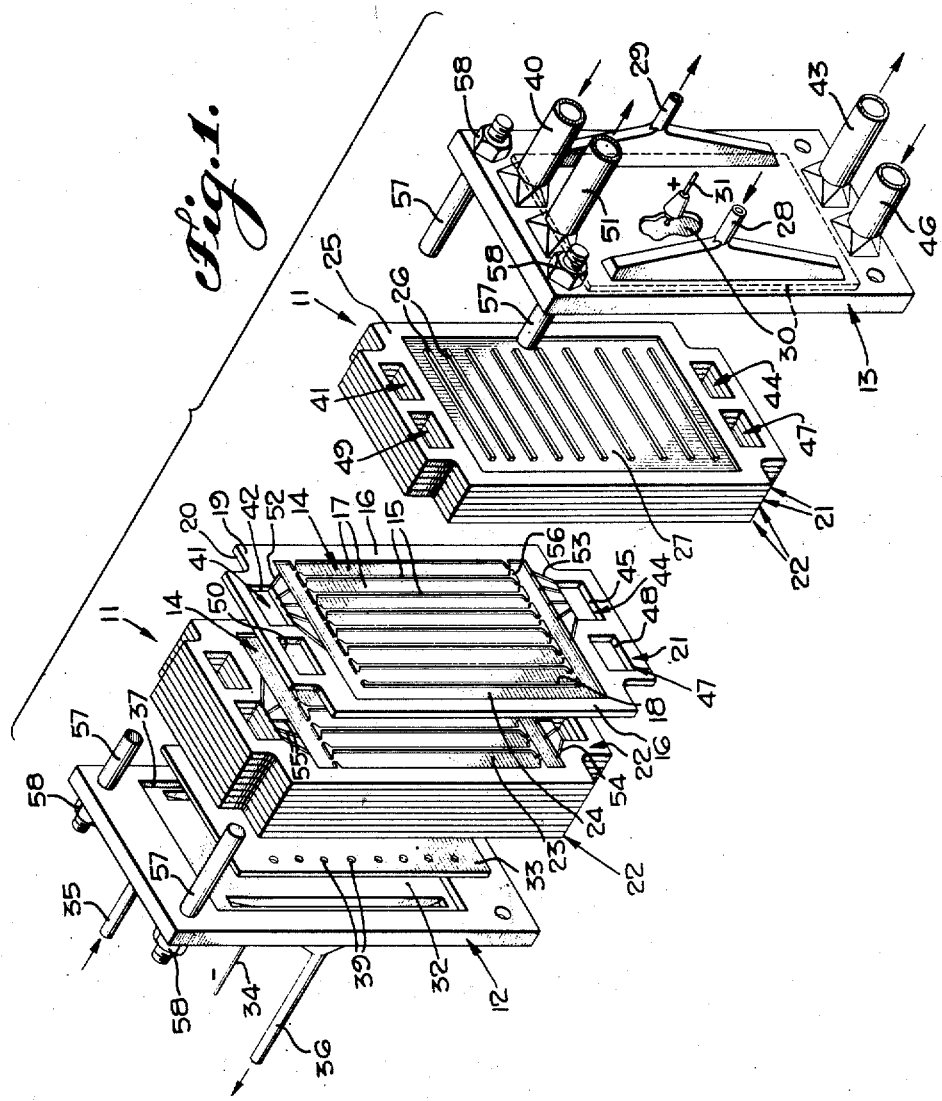
Figure 1 is a perspective view of an apparatus for electrodialysis, certain elements being shown in the exploded view fashion to show structural details.

In the following description and in the claims various details will be identified by specific names for convenience. The names, however, are intended to be as generic in their application as the art will permit. Corresponding reference characters refer to corresponding parts in the several figures of the drawings.

The drawings accompanying, and forming part of, this specification, disclose certain specific details of the invention for the purpose of explanation of broader aspects of the invention, but it is understood that the details may be modified in various respects without departure from the principles of the invention and that the invention may be applied to other structures than the one shown.

The device shown in Figure 1 is, basically, of the package, stack, or multi-cellular, type. It comprises a plurality of membranes 11 assembled between two terminal end plates 12 and 13 in such a way as to form a plurality of individual fluid chambers 14 in which, or among which, electrodialysis or ion transfer takes place.

The individual membranes are shown as provided with projecting portions or spacers 15 and 16 which have a plurality of purposes. A mechanical purpose of some or all of the projections is to space surface portions 17 of adjoining membranes in such a way as to provide definite spaces or fluid chambers 14 therebetween through which liquid may flow. The projections 15 may have the form of individual ribs forming fluid channels 18 between them. The fluid chamber 14 is confined by a bordering or marginal spacer portion 16 which also forms a seal for the chamber 14, so that the spacers 14 become individual chambers or cells separated from one another by the central body portions of the membranes 11.

Preferably the projections 15, and also the marginal sealing area 16 are formed as part of the membranes, for example by casting or molding the membrane so that each membrane has raised surface portions 15 and 16 and depressed surface portion 17. For convenience in manufacture the membranes are preferably contoured on the front side 19 only, the back side 20 being flat or plane.

The membranes 11 are divided into two groups: A first group comprises membranes having the property of being cation permeable and anion passage resistant, the second group comprises membranes which are anion permeable and cation passage resistant. Generally, one group of membranes is permeable to ions of one sign and passage resistant to ions of the opposite sign, and the other group of membranes is permeable to ions of the opposite sign.

Moldable materials of permselective character are known. Such materials may be composed of ion exchange resins, bonded together by a suitable binder such as polystyrene or polyethylene. Lists of cation exchange materials and anion exchange materials appear on pages 385 to 388 of the book "Ion Exchange" by F. C. Nachod, Academic Press, New York, 1949, and on pages 876 and 877 of the Journal of the American Waterworks Association, vol. 36, No. 8, August 1944.

The practice of forming ion exchange resins into membranes is described in detail by Wyllie and Patnode in the Journal of Physical and Colloid Chemistry, vol. 54, pages 204 to 226, February 1950, the use of permselective membranes for electrodialysis and for the determination of ion activities being described by Sollner in the Journal of the Electrochemical Society, vol. 97, No. 7, July 1950, with reference to a report on the Wyllie and Patnode membranes to the American Chemical Society in June 1949.

Wyllie and Patnode describe more particularly the manufacture of membranes composed of Amberlite resins and polystyrene as a bonding plastic. Air dried Amberlite, as used by Wyllie, appears to have a water content of between 25 and 33% of the bone dry resin, depending on the relative humidity of the air and is entirely suited for the manufacture of permselective membranes.

Suitable membranes may be manufactured as follows:

Granules of 100 mesh size of Amberlite IR-120, a representative cation exchange resin, and of Amberlite IRA-400, an anion exchange resin, are mixed with polystyrene granules of 200 mesh size, the ion exchange resins constituting 70% and the polystyrene constituting 30% of the total. The mixture is molded under a pressure of 3000 lb. per square inch at 140 degrees centigrade, maintained for one minute in a mold cavity, resulting in a membrane of approximately 1 mm. thickness at the thinnest portion.

The spaces or compartments 14 between the several membranes may be called deionization compartments 23 and concentration compartments 24, respectively, according to the character of the electrodialytic action taking place therein.

As is also apparent from the drawing, the anion permeable membranes 21 and the cation permeable membranes 22 are arranged in alternating sequence, and the flat back surface 20 of one membrane overlies the contoured front surface of the adjoining membrane.

The contour of one of the terminal membranes 25 is preferably modified in that ribs 26 are provided to extend at right angles to the ribs 15. The terminal membrane 25 is preferably cation permeable and anion passage resistant and forms a terminal chamber or cell with the end plate. The end plate has an inlet duct 28 through which electrolyte, such as raw water, may be fed into the compartment 27, and an outlet duct 29 through which liquids may be withdrawn. The terminal compartment 27 contains an electrode 30 which may be connected to the positive pole of a source of direct current (not shown) through a lead 31 making the electrode 30 an anode.

Similarly, a terminal compartment 32 is formed between the end plate 12 and the last membrane 11 which may be anion permeable and cation passage resistant. The terminal compartment 32 also contains an electrode 33 which is connected to the negative pole of a source of direct current by a lead 34. This makes the electrode 33 a cathode. The end plate 12 is likewise provided with an inlet duct 35 and an outlet duct 36.

The end plate 12 is recessed at 37, the depth of the recess being larger than the thickness of the cathode 33 to permit circulation of fluid through the terminal compartment 32. Apertures 39 in the electrode 33 facilitate the circulation of electrolyte.

Ducts are provided for supplying liquid to the several chambers or cells and further ducts are provided for withdrawing liquid therefrom.

A liquid supply duct 40 extends through the marginal portion of the end plate 13 and supplies liquid into a passage 41 formed in the membranes by registering apertures 42 which are likewise in the marginal portions 16 of the membranes.

A discharge duct 43 extends through the marginal portion of the end plate 13 and serves to withdraw ionic concentrate from the concentration compartments through a passage 44 formed by the marginal portion 16 of the membranes 11 by registering apertures 45 therein.

Similarly, a further supply duct 46 in the end plate 13 supplies liquid to be deionized into a passage 47 formed by apertures 48, and deionized liquid leaves the deionization compartments through a passage 49 formed by apertures 50 in the membranes and a discharge duct 51 in the terminal plate 13.

The passages formed in the marginal portion of the membranes are in communication with the interior space of the respective compartments through channels 52, 53, 54 and 55 formed in the marginal portions of the membrane. The passages are preferably so arranged as to distribute liquid evenly over the entire compartment and to withdraw liquid evenly from the entire compartment. Projections 56 at the end of the rib serve to restrict the flow of liquid through the several branches formed by the ribs in such a way as to cause the liquid to be evenly distributed over the entire depressed surface 17 of the membrane.

It is quite apparent in Figure 1 that all the membranes, except the terminal membrane 25, may be formed by the same mold, since the contour of one membrane, turned upside down, is the appropriate contour for the next membrane. It is understood however that the electrodialytical characteristics, in other words, the permselectivity, of adjacent membranes are opposed, in that one membrane is permeable to ions of one polarity and passage resistant to ions of the opposite polarity, whereas the next membrane is permeable to ions of the opposite polarity.

The stack of membranes 11 is assembled with the end plates 12 and 13 by bolts 57 and nuts 58 which, properly tightened, form a liquidtight stack comprising a plurality of compartments, the number of compartments being optional and variable by selection of an appropriate number of membranes.

The apparatus operates substantially as follows:

It may be assumed that an electrical potential is applied to the electrodes 30 and 33. Raw liquid, such as raw water, enters the several compartments through supply ducts 46, 47 and water enters the concentration compartments through ducts 40, 41.

Assuming, for reasons of simplicity, that the only salt present in the raw water is sodium chloride, the positively charged sodium cations are attracted by the cathode 33 and tend to travel towards it. The sodium cations pass through the cation permeable membranes 21 and accumulate in the concentration compartments 24 which they are unable to leave because of the cation passage resistant properties of the membranes 22 which block their path. Thus sodium ions accumulate in the concentration compartments 24. Similarly, the chlorine anions pass through the anion permeable membranes 22 and accumulate in the concentration compartments 24 from which their exit is blocked by the anion passage resistance of the membranes 21.

The migration of sodium and chlorine ions into the concentration compartments causes the salt concentration of the water in the concentration compartments 24 to increase, while simultaneously the salt concentration in the deionization compartments 23 is correspondingly decreased.

Assuming the flow of water through the compartments is sufficiently slow, and the potential applied to the electrodes 30 and 33 is sufficient to cause migration of substantially all of the sodium and the chlorine ions into the concentration compartments 24, the liquid discharged through the ducts 44, 43 has increased salinity, whereas the water discharged from ducts 49, 51 is desalted, making it suited for industrial or agricultural uses, or for human consumption as fresh water.

However, it is generally preferable, in commercial installations, to carry out the deionization process in several successive stages because of certain economic advantages flowing from stage-by-stage operations in which the ion content of liquid leaving the stage through the duct 51 is reduced, for example, to one-tenth of the ion content of the liquid entering the respective stage through the duct 46.

It will be noted that, aside from the change in ionic concentration, no electrochemical reaction takes place in any of the intermediate treatment cells, since these cells do not contain electrodes.

Considering now the changes taking place in the terminal compartments 27 and 32, it is apparent that chlorine anions migrate through the anion permeable membrane forming part of the compartment 32, thus depleting the compartment of chlorine ions. As a result an unbalanced surplus of sodium tends to remain in the compartment which causes formation of sodium hydroxide and hydrogen. Because of this reaction the liquid of the compartment 32 is discharged separately through the duct 36 and is not mixed with the products of the intermediate compartments.

Similarly, sodium cations migrate from the terminal compartment 27 through the cation permeable membrane 21 tending to leave a chlorine surplus in the compartment which is discharged from it either as a gas, or in solution with the water leaving the compartment through the separate duct 29, the raw water entering through duct 28.

The electrodes 30 and 33 are made of a material resisting decomposition. Carbon or graphite may be used as anode and iron or nickel chromium may serve as cathode.

The degree of deionization attainable in any electrodialysis apparatus depends on the permselectivity of the membranes, more particularly the ability of the membrane to restrict the passage of ions therethrough which the membranes are designed to block. Ions passing through a passage resistant membrane are commonly referred to as "leakage ions" and tend to contaminate the dilute by passage into the dilution compartments from the adjoining concentration compartments.

Figure 5:
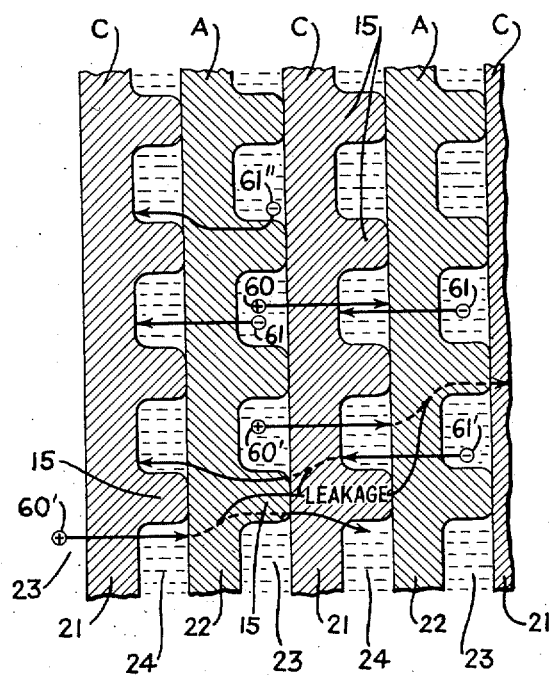
Figure 5 is a diagram illustrating the operation of membrane projections in the conduction of leakage ions.

Figure 5 is a diagrammatic rib presentation of five membranes of which membranes 21 are cation permeable, anion passage resistant and membranes 22 are anion permeable and cation passage resistant. Cations 60 tend to travel to the right towards the cathode (not shown) as indicated by arrows and anions 61 tend to travel to the left as indicated by arrows. The anions pass freely through the anion permeable membranes 22, and the cations travel freely through the cation permeable membranes 21. The chamber 23 becomes a deionization chamber, whereas the chamber 24 becomes a concentration chamber. The length of the arrows extending from ions 60 and 61 indicates the distance which the anions and the cations can travel assuming that the membranes are one hundred percent selective.

Commercially available membranes however are not one hundred percent selective and, as a result, a limited number of ions leak through the passage resistant membranes into the adjoining deionization compartment, thus contaminating the dilute therein.

The ribs or spacers 15 reduce such contamination by providing preferred paths through which leakage ions can travel. The leakage anion 61' entering the anion passage resistant membrane 21 has a choice of either entering the dilution chambers 23 or entering the rib or projection 15 of the adjacent membrane 22 which is anion permeable. Since the resistivity of the dilute liquid in the dilution chamber 23 is high as compared to the resistivity of the rib or projection 15 of membrane 22 which consists of anion permeable material, the leakage ions enter the projections of the permeable membranes in preference to passage into the dilute liquid having high resistivity.

The resistivity of permeable membranes is low as compared to the contacting electrolyte by reason of the concentrating action of the permeable membrane. The concentrating action is produced by bound electric charges in the physical structure of the membrane. These charges are countered by mobile ions which are present in the membrane pores in considerably higher concentration than the concentration of the ions in the contacting liquid. This theory of membrane performance has been discussed by numerous authors and is described in particular detail by Kalauch in Kolloid Zeitschrift, vol. 112, pages 21 to 26 (1949).

The presence of projections, in whatever form, of membrane material reduces the passage of leakage ions into the dilute by providing a low resistance by-path around the liquid of relatively high ohmic resistance in the dilution chambers.

Tracing the path of anion 61', it is seen that the ion after leakage through the passage resistant membrane 21 preferably enters the permeable membrane 22 through which it is conducted freely. The ion 61' then has a choice of entering the projection 15 of the next membrane 21 or of entering the liquid chamber 24. Since the membrane 21 is passage resistant and offers relatively high resistance to the ion 61', the ion preferably enters the liquid in the concentration 24 which has a relatively low ohmic resistance.

Similar considerations apply to leaking cations 60' moving in the opposite direction.

It is now seen that the presence of projections of membrane material leads to a reduction of the effects of ionic leakage and a consequent improvement of the quality of the dilute.

The projections and ribs offer further advantages with regard to the process of deionization itself. The ribs or projections increase the membrane surface exposed to the ionic solution to be deionized and, in effect, increases the active area of the membranes. A further, less obvious advantage is gained by the fact that the projections provide a preferred path for a substantial portion of ions which, by reason of their location within the solution at a particular moment are closer to a rib or projection of permeable material than to the remainder of the surface of the same membrane. A path of reduced resistance is thus provided for ions which can take the shorter path into a rib or projection in preference to the longer path through the liquid chamber into the face of the membrane. Ion 61″ enters the projection 15 in preference to traveling across the major portion of the liquid space 23 in order to enter the face of the membrane 22.

As a result, the ohmic resistance of the apparatus is reduced and its efficiency increased.

Figure 2:
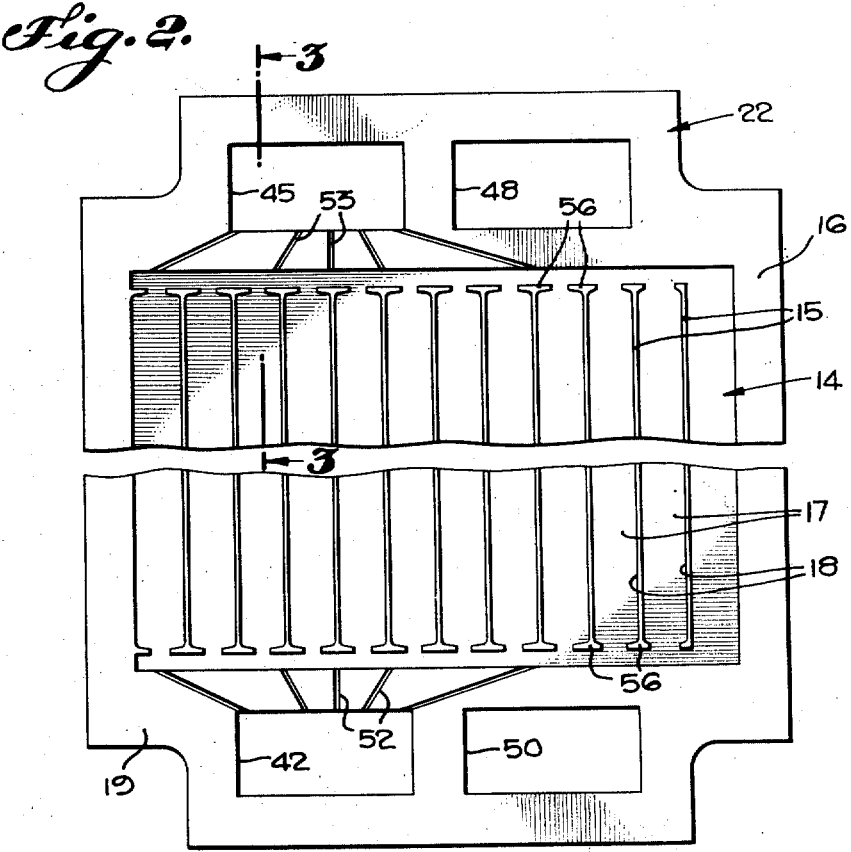
Figure 2 is a plan view of an ion discriminating membrane of the apparatus shown in Figure 1.
Figure 3:
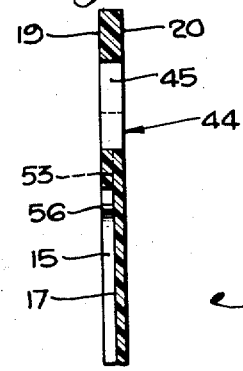
Figure 3 is a sectional view taken on line 3—3 of Figure 2.
Figure 4:
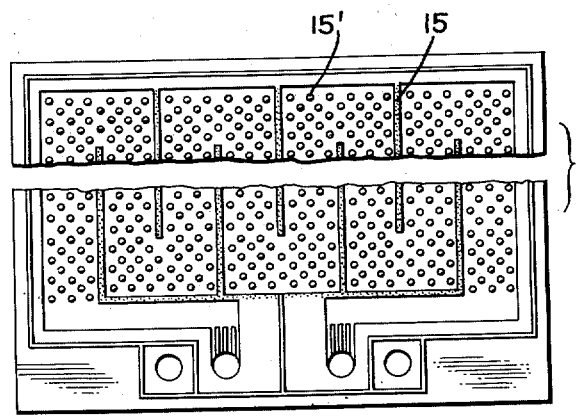
Figure 4 is a plan view of a modified form of membrane, the central portion of the figure being omitted to reduce its size.

The projections may have the form of ribs as shown in Figures 1 to 3, but may also have numerous other forms. Figure 4 illustrates a form of membrane in which all the ducts are located on one side of the membrane and in the projections in the form of ribs 15 and stud-like projections or pimples 15′ between the ribs.

The thickness of the liquid films in the compartments may be of the order of 1 mm. The thickness of the central portion of the membranes may be of the same order and may even be less.

For reasons of economy it is advantageous to maintain the difference in the concentration on opposite sides of the membranes at a minimum for all points of the membranes. This is accomplished in the illustrated apparatus by opposite flow through the concentration compartment with respect to the direction of flow through the deionization compartment. This feature forms the subject matter of my co-pending application Serial No. 175,126, filed July 21, 1950.

The improvements gained by the invention in obtaining a higher degree of deionization and reduced ohmic resistance are exemplified by the following results of tests:

Several dialyzers of identical dimensions were constructed, each apparatus comprising two diluting chambers, three concentration chambers and two electrode chambers, the arrangement being as follows:

Anode, cation membrane, anion membrane, cation membrane, anion membrane, cation membrane, anion membrane, cathode. This arrangement results in the following sequence of chambers: electrode chamber, concentrating chamber, diluting chamber, concentrating chamber, diluting chamber, concentrating chamber, electrode chamber.

The membranes were of the size of 20 mm. by 100 mm., having a thickness of 1 mm., the spacing between the membranes being 1 mm. The cation membranes were molded according to the Wyllie and Patnode technique disclosed in the Journal of Physical and Colloid Chemistry, vol. 54, particular data being as follows: Amberlite IR-120 was used in the manufacture of the cation membranes and Amberlite IRA-400 was used in the manufacture of the anion membranes. The Amberlite was used in air dried condition, as disclosed by Wyllie, and was of a mean particle size of about 0.1 mm. diameter. Polyethylene of a mean particle size of 0.05 mm. was used as a binder, and 28% binder, by weight, was combined with 72% of ion exchange resin. The mixture was placed in a mold, pressure of about 500 lb. per square inch was applied and then the temperature was increased to a maximum of 150° C. When 140° C. was reached the pressure was increased to 2500 p. s. i., and maintained one minute after the temperature of 150° C. was reached, a total time of about five minutes.

After molding the membrane surfaces were ground with an abrasive to remove any possible surface film of binder.

Test apparatus I was constructed with flat membranes spaced by ten equally spaced ion passage impermeable non-conductive spacers of polyethylene sheet material of 1 mm. width, extending the length of the membrane. This apparatus was used as a standard of comparison, representing conventional construction.

Apparatus II was constructed by membranes having ten equally spaced ribs extending from one side of each membrane, the spacer ribs being integral with, and consisting of the same material as the membrane, the height of each rib being 1 mm.

Apparatus III was of identical construction as apparatus II except that strips of polyethylene film of 0.05 mm. thickness were placed on top of each rib, to prevent conductive contact of the rib of ion exchange material of one membrane with the surface of the next membrane. This arrangement was chosen to prevent ions from passing directly through the contact areas.

Apparatus IV was constructed of membranes having ribs on both sides, the height of each rib being 0.5 mm., there being conductive contact between the ribs of adjacent membranes.

Apparatus V was constructed identical in all respects with apparatus IV with conductive contact between the ribs, except that the membrane surface between the ribs was covered with an insulating film of polyethylene of 0.05 mm. thickness so as to render the flat portion of the membrane surface, except the rib surface, substantially ineffective.

Apparatus VI was constructed to correspond in all details with apparatus IV, except that the contacting areas of the ribs were separated by insulating strips of polyethylene of 0.05 mm., thickness so as to prevent direct passage of ions from rib to rib.

Before the test the membranes of each apparatus were first equilibrated in an aqueous NaCl solution of 1000 p. p. m. concentration. During the test a flow of 5 cc./min. of an aqueous NaCl solution of 1000 p. p. m. was maintained through the electrode compartments only.

All the chambers of the various forms of apparatus were filled with an aqueous NaCl solution of 1000 p. p. m. concentration. A potential of 5 volts of direct current was applied to the electrodes for 15 minutes. The dilute was then removed from both diluting chambers, mixed and tested to determine the reduction of the ion content by measurement of specific resistivity. The following results were obtained:

I. (Insulating spacers; only membrane surfaces active)— 685 p. p. m.

II. (Integral ribs contacting surface of next membrane)—455 p. p. m.

III. (Integral ribs, insulated at contact surfaces)—410 p. p. m.

IV. (Contacting integral ribs on both sides of the membranes)—340 p. p. m.

V. (Apparatus IV except membrane area between the ribs covered; only rib side surfaces active)—145 p. p. m.

VI. (Integral ribs on both sides of the membranes insulated at contact surfaces)—290 p. p. m.

A comparison of the results of apparatus I and apparatus II shows that a considerably higher degree of deionization is obtained by the use of integral ribs.

A comparison of the results of apparatus III with the results of apparatus II shows that a slightly higher degree of deionization is obtained by insulation at the points of contact, particularly in the concentration chamber where such insulation is most effective. Insulation prevents direct passage of ions from one membrane to the next and, if applied in concentration chambers, reduces the number of ions which pass beyond, in other words leak from, the concentration chamber, whence they may reach the next deionization chamber and contaminate the liquid therein to some extent.

As appears from later tests, the most favorable arrangement is one in which ion conductive contact is provided for in the deionization chambers and where such contact is prevented by interposed thin ion non-permeable insulation in the concentration chambers.

A comparison of the results of apparatus II and IV shows that a slight improvement is obtained by ribs on opposite sides of the membrane as compared to ribs on one side only.

The test results of apparatus V show that a very high degree of deionization is obtained where the passage of ions occurs predominantly through the surface of the ribs or projections, and where the passage through the remainder of the membrane surfaces is restricted.

The comparison of the performance of apparatus VI having insulated contacting surfaces with that of apparatus IV having conductive contacting surfaces shows approximately the same difference in performance as was between the performances of apparatus III and I.

The effectiveness of interposing insulation at the points of contact in the concentration chambers, while maintaining ion-conductive contact in the deionization chambers was tested by an apparatus which, in effect, is a combination of apparatus II and apparatus III. Integral ribs of membrane material make ion conductive contact with the surface of the next membrane in the deionization compartments and integral ribs of membrane material bear against the surface of the next membrane in the concentration compartments, but insulated by a film of insulating material of 0.5 mm. thickness at the point of contact. Degree of deionization obtained: 320 p. p. m.

The effect of the ion conductive projections or ribs on the total ohmic resistance of the apparatus was then determined in the following manner:

Apparatus I, II and III were compared. For this purpose the electrode chambers and their deionization chambers were filled with an aqueous NaCl solution of 5000 ohms resistivity as determined by an A. C. measurement at 1000 cycles. The concentration chambers of the three forms of apparatus were filled with an aqueous NaCl solution of 500 ohms resistivity, and the total resistances of the three apparatus were then measured with the following results:

Apparatus I having non-conductive projections or spacers—total resistance 360 ohms.

Apparatus II having ion conductive ribs or spacers in contact with the next respective membrane—total resistance 95 ohms.

Apparatus III of the same construction as apparatus II except for insulation interposed at the contacting surfaces—total resistance 192 ohms.

Apparatus II was then tested after removal of the concentrate from the concentration chambers and removal of the dilute from the deionization chambers, leaving only the electrolyte in the electrode chambers. The total resistance of the apparatus was then measured and found to be 115 ohms.

The relatively low ohmic resistance of the apparatus, after removal of the ionic liquid from the concentration and deionization compartments indicates the advantages which may be gained by employing the present invention in apparatus where conditions may arise under which the deionization in one or several deionization compartments is carried to a higher degree than the deionization in other compartments.

In a conventional multi-compartment electrodialyzer the current ceases to flow theoretically if the deionization of the liquid in any one of the deionization compartments is complete. While this condition is an extreme one and while a state of infinite resistance of one of the deionization compartments is attained only in theory, the described condition is approximated in a degree in commercial or laboratory installations where circumstances may arise which cause the deionization in certain compartments to proceed at a faster rate than in others. Such a condition may be created by an obstruction of the flow through one of the deionization compartments causing the liquid in the respective deionization compartment to be subject to the dialyzing current for a longer period of time than the liquid in the other deionization compartment. The result is unequal deionization, since the deionization in the compartment of reduced flow is carried to a higher degree than average, whereas the deionization in the other compartment is less than average due to the reduction of the total current caused by the increased ohmic resistance of the liquid in the one compartment.

The present invention is very effective in correcting such a situation by the use of membranes having receding and projecting portions in which the projecting portions are in contact with the next membrane and provide a path for ions from one electrode compartment to the other through the ion conductive membrane material.

The effectiveness of the invention in this regard is illustrated in the following tests.

The performances of apparatus I and II were compared under the following conditions:

One of the deionization compartments was filled with an aqueous NaCl solution of 500 p. p. m. concentration. The other deionization compartment and the concentrating compartments were filled with an aqueous solution of NaCl of a concentration of 1000 p. p. m. A flow of electrolyte was maintained through the electrode compartments at the rate of 5 cc./min., the electrolyte being NaCl solution of 1000 p. p. m. concentration. The apparatus was operated for 5 minutes at 7 volts, the contents of the deionization chambers were then removed and tested with the following results:

Apparatus I having non-conductive projections or spacers—deionization compartment a—ion content reduced from 500 p. p. m. to 440 p. p. m.; deionization compartment b—ion content reduced from 1000 p. p. m. to 780 p. p. m.

Apparatus II having ion conductive projections in contact with the next respective membrane—deionization compartment a—ion content reduced from 500 p. p. m. to 325 p. p. m.; deionization compartment b—ion content reduced from 1000 p. p. m. to 355 p. p. m.

A comparison of performance of apparatus I and II shows that the presence of ion conductive projections is corrective in two respects. The inequality in the degree of deionization of the liquid in deionization compartments a and b was almost completely eliminated and secondary, the deionization was carried to a higher degree in apparatus II than in apparatus I.

Figure 6:
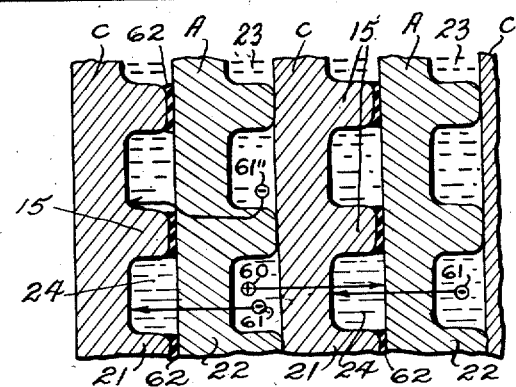
Figure 6 shows a modification of the arrangement of Figure 5.

A further test was conducted by modifying the construction of apparatus II in the following manner:

The ion conductive contact from membrane to membrane was maintained in the deionization compartments only, whereas the contact was broken in the concentration compartments by interposed polyethylene films 62 of 0.05 mm. thickness at the points of contact, as shown in Figure 6. The following results were obtained: deionization compartment a—ion content reduced from 500 p. p. m. to 285 p. p. m.; deionization compartment b—ion content reduced from 1000 p. p. m. to 670 p. p. m.

A reasonable interpretation of the results of these tests is that the conductive contact from membrane to membrane permits a certain flow of leakage ions to exist across the deionization compartments by way of the ion conductive contact between the projecting portion of one membrane and the surface of the next membrane. This flow of leakage ions permits deionization to continue in a deionization compartment containing liquid of relatively high ion content, the flow of leakage ions from the neighboring concentration compartments being relatively small. The deionization in the other deionization compartments containing liquid of relatively low ion content continues at a slower rate and the current is carried predominantly by leakage ions from the neighboring concentration compartments, the leakage ions being conducted across the deionization compartments predominantly by the ion conductive path which exists from membrane to membrane.

It is thus seen that the performance of apparatus which operate by reason of transfer ions through permselective walls or membranes is materially improved by providing the walls or membranes with projecting and receding portions, which projecting portions make contact with the next membrane, thus providing an ion conductive path from membrane to membrane in certain or all of the compartments.

Evidently the invention may be applied to and practiced by various forms of apparatus and is not limited to the specific devices illustrated in the drawings. Numerous changes, additions, omissions, substitutions and modifications may be made without departing from the spirit, teaching and principles of the invention.

What is claimed is:

1. An apparatus for the continuous transfer of ions from one volume of liquid into another, the apparatus comprising, a stack of permselective membranes, alternating membranes being permeable to ions of one sign and passage resistant to ions of the opposite sign, the remaining membranes being permeable to ions of the opposite sign, said membranes comprising a marginal sealing area and a central body area of the same material as the marginal area and integral therewith, certain of said membranes having, at least on one side, projections integral with, and of the same material, as the central area, said projections bearing against the surface of the next membrane in the stack to space the membranes apart so as to provide liquid chambers of predetermined thickness between adjacent membranes and to provide portions of membrane-to-membrane contact within said chamber through which portions certain ions may pass from one membrane to the next, the chambers of the stack being divided into two groups, alternating chambers constituting one group and the remaining chambers constituting a second group; end plates bearing against the endmost membranes of the stack for urging said membranes together along said marginal areas and said projections; electrodes in spaced chambers of the stack; duct means on opposite sides of the central area for conducting liquid to be deionized through the chambers of one group; and separate duct means for the other group of chambers into which chambers ions removed from the liquid to be deionized are to be transferred, said projections within the central areas being provided at least in said chambers of the one group, said marginal areas including surface channels extending between the respective duct and the central area.

2. An apparatus for the continuous transfer of ions from one volume of liquid into another, the apparatus comprising, a stack of permselective membranes, alternating membranes being permeable to ions of one sign and passage resistant to ions of the opposite sign, the remaining membranes being permeable to ions of the opposite sign, said membranes comprising a marginal sealing area and a central body area of the same material as the marginal area and integral therewith, certain of said membranes having, at least on one side, ribs integral with, and of the same material as, the central area, said ribs bearing against the surface of the next membrane in the stack to space the membranes apart so as to provide a liquid chamber of predetermined thickness between the membranes and to provide portions of membrane-to-membrane contact within said chamber through which portions certain ions may pass from one membrane to the next, said chamber being subdivided into channels by said ribs, the chambers of the stack being divided into two groups, alternating chambers constituting one group and the remaining chambers constituting a second group; end plates bearing against the endmost membranes of the stack for urging said membranes together along their marginal areas and said ribs; electrodes in spaced chambers of said stack; duct means on opposite sides of the central portion for dividing liquid to be deionized into branch flows and conducting said branch flows through the chambers of one group; and separate duct means for the other group of chambers into which chambers ions removed from the liquid to be deionized are to be transferred, said ribs being provided in the chambers of at least said one group, said marginal portions including surface channels extending between the respective ducts and the central portion.

3. In an apparatus for transferring ions from one volume of liquid into another, the assembly of two membranes, one membrane being superimposed upon the other, one membrane consisting of a material permeable to ions of one sign and passage resistant to ions of the opposite sign, the other membrane being permeable to ions of the opposite sign, at least one of the membranes comprising a marginal sealing area and a central body area of the same material as the marginal area and integral therewith, said one membrane having, at least on one side, projections on, integral with and of the same material as, the central area, said projections bearing against the back surface of the superimposed membrane, thereby spacing said membranes apart so as to form a liquid chamber between them through which liquid may pass, the projections providing portions of membrane-to-membrane contact within said chamber through which portions certain ions may pass from one membrane to the next, duct means on opposite sides of the said central area for conducting liquid to, and from, said central area, said marginal area including surface channels extending between the respective ducts and the central area.

4. A multicellular apparatus for transferring ions from one volume of liquid into another, the apparatus comprising a plurality of permselective membranes arranged in stacked relationship, certain of the membranes being permeable to ions of one sign and passage resistant to ions of the opposite sign, other membranes being permeable to ions of the opposite sign, the membranes having a central area exposed to liquid and a marginal area along which marginal area the membranes are sealed with respect to one another, at least certain of the membrances having a central area comprising integral projections thereon of the same permselective material as the central area, said projections bearing against the surface of the membrane superimposed thereon to space the central area positively from such superimposed membrane and provide portions of membrane-to-membrane contact within said central area through which portions certain ions may pass from one membrane to the next; and duct means on opposite sides of said central area for conducting liquid to, and from, said central area.

5. A multicellular apparatus for transferring ions from one volume of liquid into another, the apparatus comprising a plurality of permselective membranes arranged in stacked relationship, certain of the membranes being permeable to ions of one sign and passage resistant to ions of the opposite sign, other membranes being permeable to ions of the opposite sign, the membranes having a central area exposed to liquid and a marginal area, along which marginal area the stacked membranes are sealed with respect to one another, at least some of the membranes having a central area comprising integral ribs thereon of the same permselective material as the central area, said ribs bearing against the surface of the membrane superimposed thereon to space the central area positively from such superimposed membrane and provide portions of membrane-to-membrane contact within said central area through which portions certain ions may pass from one membrane to the next; and duct means on opposite sides of said central area for conducting liquid to, and from, said central area.

6. A multicellular apparatus for transferring ions from one volume of liquid to another, the apparatus comprising a plurality of permselective membranes arranged in stacked relationship, certain of the membranes being permeable to ions of one sign and passage resistant to ions of the opposite sign, other membranes being permeable to ions of the opposite sign, the membranes having a central area exposed to liquid and a marginal area integral with the central area along which marginal area the stacked membranes are sealed with respect to one another, at least some of the membranes having a central area comprising integral projections thereon of the same material as the central area, said projections bearing against the surface of the membrane superimposed thereon to space the central area positively from such superimposed membrane to provide portions of membrane-to-membrane contact within said central area through which portions certain ions may pass from one membrane to the next, the height of the projections being of the order of one millimeter; and duct means on opposite sides of the central area for conducting liquid to, and from, said central area, said duct means including margin channels within said marginal area.

7. An apparatus for the continuous transfer of ions from one volume of liquid into another, the apparatus comprising, a stack of permselective membranes, alternating membranes being permeable to ions of one sign and passage resistant to ions of the opposite sign, the remaining membranes being permeable to ions of the opposite sign, said membranes having raised spacer ribs on their central portions, the ribs of each membrane being of membrane material, integral with the central portion and contacting the surface of the adjacent membrane in the stack, thereby providing portions of membrane-to-membrane contact within said central area through which portions certain ions may pass from one membrane to the next, the stacked membranes forming liquid chambers of a predetermined thickness between adjacent membranes, said chambers being subdivided by said ribs into channels, alternating chambers constituting a first group, the chambers lying between the chambers of the first group constituting a second group, adjacent membranes being sealed along marginal sealing portions integral with the central portion, said marginal sealing portions having registering apertures in them, said apertures forming fluid ducts extending through the stack, the chambers of the first group communicating with two of said ducts located on opposite sides of the central portion, said marginal portion including surface channels extending between the central portion and the respective duct, one of said ducts constituting an inflow duct and the other duct constituting an outflow duct, said surface channels being open towards the adjacent membrane and covered thereby, thus forming a passage for liquid to and from the central portion, the chambers of the second group communicating with the remaining two ducts, said ribs extending substantially in the direction of liquid flow from the respective inflow duct to the respective outflow duct.

8. In an apparatus for transferring, by the action of an electric current, ions from one volume of liquid into another, the assembly of two membranes, one membrane being superimposed upon the other, one membrane consisting of permselective material and being permeable to ions of one sign and passage resistant to ions of the opposite sign, the other membrane being permeable to ions of the opposite sign, the membranes comprising a central body area and a marginal sealing area and spacer means consisting of membrane material and extending from the central body area of one membrane towards the central body area of the other membrane, said spacer means spacing said membranes to define a liquid chamber therebetween through which chamber liquid may pass, said spacer means further providing a low resistance path for leakage ions from said one membrane to the other membrane, whereby leakage ions are preferably conducted by said spacer means and passage of leakage ions into said liquid chamber is minimized.

9. A multi-cellular apparatus for transferring ions from one volume of liquid into another, the apparatus comprising, a plurality of ion permeable membranes arranged in stacked relationship, certain of the membranes being permeable to ions of one sign and passage resistant to ions of the opposite sign, other membranes being permeable to ions of the opposite sign, at least certain of the membranes having a contoured central area including projecting portions and receding portions, said projecting as well as said receding portions being of ion permeable membrane material, said projecting portions providing a shorter path for ions from the respective membrane to the next membrane than the receding portions, the receding portions providing a liquid space of a certain thickness between the receding portions and the next membrane of the stack, at least certain of said projecting portions being in membrane-to-membrane contact with the next membrane of the stack to provide contact areas through which certain ions may pass from one membrane to the next with less ohmic resistance than from the receding portion through the said liquid space; and duct means on substantially opposite sides of the central area for conducting liquid across said contoured central area.

10. In an apparatus for transferring, by the action of an electric current, ions from one volume of liquid into another, the assembly of two membranes, one membrane being superimposed upon the other, one membrane consisting of permselective material and being permeable to ions of one sign and passage resistant to ions of the opposite sign, the other membrane being permeable to ions of the opposite sign, at least one of the membranes comprising a contoured central area including portions projecting towards, and other portions receding with respect to, the other membrane, said projections as well as said receding portions being of ion permeable material, said projecting portions providing a shorter path for ions from said one membrane to the other than the receding portions of the one membrane, the receding portions providing a liquid space of a certain thickness between the receding portions and the other membrane, at least certain of said projecting portions being in membrane-to-membrane contact with the other membrane to provide contact areas through which certain ions may pass from one membrane to the other with less ohmic resistance than from the receding portion through the said liquid space.

11. In an apparatus for transferring, by the action of an electric current, ions from one volume of liquid into another, the assembly of two membranes, one membrane being superimposed upon the other, one membrane consisting of permselective material and being permeable to ions of one sign and passage resistant to ions of the opposite sign, the other membrane being permeable to ions of the opposite sign, at least one of the membranes comprising a contoured central area including portions projecting towards, and other portions receding with respect to, the other membrane, said projections as well as said receding portions being of ion permeable membrane material, said receding portions providing a liquid space of a certain thickness between said receding portions and the other membrane through which space a flow of liquid may pass, at least certain of said projecting portions bearing against the other membrane to provide membrane areas of closer proximity with regard to the other membrane than said receding portions through which areas certain ions may pass from one membrane to the other with less ohmic resistance than from the receding portion through the said liquid space; and means for moving a flow of liquid through said liquid space between said membranes except at said areas of contact of said certain projecting portions.

12. An apparatus as defined in claim 11 in which ion impermeable insulating means are interposed between said membranes at the areas of contact.

13. A multi-cellular apparatus for transferring ions from one volume of liquid into another, the apparatus comprising a pair of electrodes; a plurality of semi-permeable membranes arranged in spaced stacked relationship between said electrodes, certain of the membranes being permeable to ions of one sign and passage resistant to ions of the opposite sign, other membranes being permeable to ions of the opposite sign, whereby concentration chambers and dilution chambers are formed between consecutive membranes, at least certain of the membranes having a contoured central area including projecting portions and receding portions, said projecting as well as said receding portions being of ion permeable membrane material, said receding portions providing a liquid space of a certain thickness between the receding portions and the next membrane of the stack through which space a flow of liquid may pass, at least certain of said projecting portions bearing against the next membrane of the stack to provide membrane areas of closer proximity with regard to the next membrane than said receding portions through which areas certain ions may pass from one membrane to the next with less ohmic resistance than from the receding portion; duct means on substantially opposite sides of the central area for conducting liquid across said contoured central area; and ion impermeable insulating means interposed between said membranes at the said areas of contact in the concentration chambers.

References Cited in the file of this patent

UNITED STATES PATENTS

| 1,849,622 | Heibig | Mar. 15, 1932 |
| 2,252,213 | Skolnik | Aug. 12, 1941 |
| 2,636,851 | Juda et al. | Apr. 28, 1953 |

FOREIGN PATENTS

| 21,727 | Great Britain | of 1914 |

OTHER REFERENCES

Meyer et al.: "Helvetica Chimica Acta," vol. 23 (1940), pp. 795–800.

UNITED STATES PATENT OFFICE

CERTIFICATE OF CORRECTION

Patent No. 2,799,644                                          July 16, 1957

Paul Kollsman

It is hereby certified that error appears in the printed specification of the above numbered patent requiring correction and that the said Letters Patent should read as corrected below.

Column 3, line 16, for "spacers" read -- spaces --; column 9, line 24, for "0.5 mm." read -- 0.05 mm. --; column 11, line 24, for "material, as the central" read -- material as, the central --.

Signed and sealed this 15th day of October 1957.

(SEAL)
Attest:
KARL H. AXLINE
Attesting Officer

ROBERT C. WATSON
Commissioner of Patents